United States Patent [19]

Taniu et al.

[11] Patent Number: 5,373,527
[45] Date of Patent: Dec. 13, 1994

[54] LASER GENERATING APPARATUS HAVING AN ARRANGEMENT FOR CONVERGING AND DIVERGING EXCITATION LIGHT

[75] Inventors: Yoshito Taniu, Matsubushi; Koichiro Wazumi; Akihiro Nishimi, both of Yokohama; Fumio Matsuzaka, Tokyo; Kenichi Ueda, Chofu, all of Japan

[73] Assignee: Ishikawajima-Harima Heavy Industries Co., Ltd., Tokyo, Japan

[21] Appl. No.: 106,701

[22] Filed: Aug. 16, 1993

[30] Foreign Application Priority Data

Aug. 17, 1992 [JP] Japan ................. 4-218023

[51] Int. Cl.$^5$ ............................................ H01S 3/091
[52] U.S. Cl. ................................ 372/71; 372/69; 372/70; 372/72; 372/75
[58] Field of Search ............... 372/39, 69, 70, 71, 372/72, 9, 75, 66

[56] References Cited

U.S. PATENT DOCUMENTS

| | | | |
|---|---|---|---|
| 3,382,622 | 5/1968 | Dixon et al. | 372/71 |
| 3,508,165 | 4/1970 | Nicolai | 372/41 |
| 3,683,296 | 8/1972 | Scalise | 372/75 |
| 4,164,366 | 8/1979 | Sziklas et al. | 372/66 X |
| 4,756,002 | 7/1988 | Ruggieri et al. | 372/70 |
| 4,860,295 | 8/1989 | Byer et al. | 372/70 X |

FOREIGN PATENT DOCUMENTS

| | | |
|---|---|---|
| 1527652 | 4/1968 | France . |
| 1539121 | 8/1969 | Germany . |
| 1-107588 | 4/1989 | Japan . |
| 1-205484 | 8/1989 | Japan . |
| 2215906 | 9/1989 | United Kingdom . |

OTHER PUBLICATIONS

Patent Abstracts of Japan, vol. 001, No. 072 (E-028) Jul. 13, 1977 (Abstract of JP-52 008 790), Takaoka.
Patent Abstracts of Japan, vol. 13, No. 348 (E-799) Aug. 4, 1989 (Abstract of JP-A-01 107 588), Yoshiaki.

*Primary Examiner*—Rodney B. Bovernick
*Assistant Examiner*—Hemang Sanghavi
*Attorney, Agent, or Firm*—Finnegan, Henderson, Farabow, Garrett & Dunner

[57] ABSTRACT

A laser generating apparatus provided with the following is disclosed. That is to say, a rod shaped laser medium for receiving excitation light irradiation and emitting laser light having a prespecified wavelength, a reflecting tube having a central axis and possessing a rotating surface and two end surfaces, wherein an inner surface is made a reflecting surface, and the rod shaped laser medium is stored therewithin, and a virtual light source formation mechanism for forming an excitation virtual light source which can be construed as a point light source or a line light source, in the vicinity of the central axis. By means of this, a virtual light source having an energy distribution concentrated in the central part is formed, and it is possible to increase excitation efficiency.

13 Claims, 5 Drawing Sheets

HIGH ABSORPTION

PERIPHERAL EXCITATION STATE

INTERMEDIATE ABSORPTION
UNIFORM EXCITATION STATE

LOW ABSORPTION

CENTRAL EXCITATION STATE

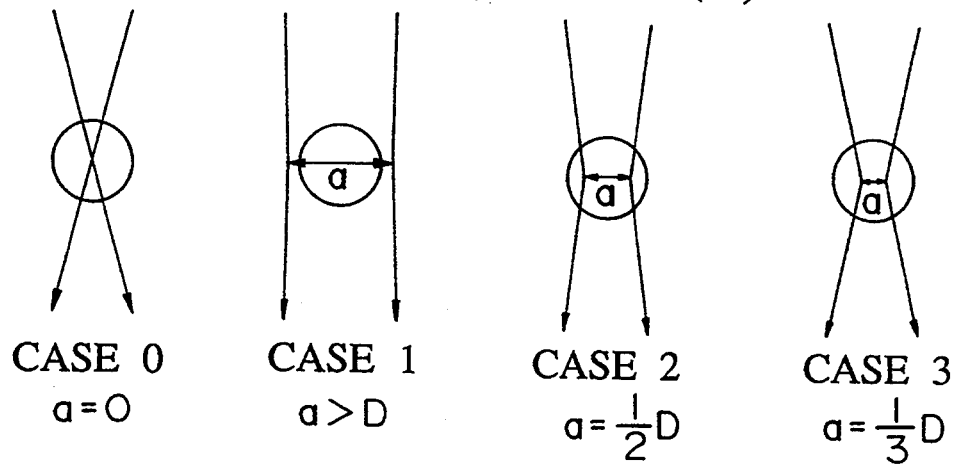
FIG.11(A)   FIG.11(B)   FIG.11(C)   FIG.11(D)
CASE 0    CASE 1    CASE 2    CASE 3
$a=0$    $a>D$    $a=\frac{1}{2}D$    $a=\frac{1}{3}D$
FIG.11(E)
FIG.12(A)    FIG.12(B)    FIG.12(C)
  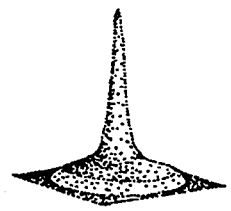
FIG.13(A)      FIG.13(B)
 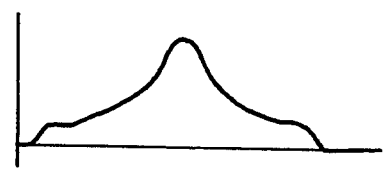
FIG.14(A)      FIG.14(B)
 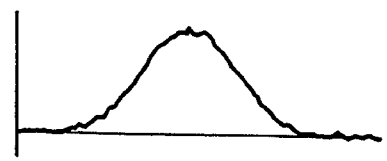

LASER GENERATING APPARATUS HAVING AN ARRANGEMENT FOR CONVERGING AND DIVERGING EXCITATION LIGHT

BACKGROUND OF THE INVENTION

The present invention relates to a laser generating apparatus which excites a solid state lasing medium by means of laser light, and thereby outputs laser light.

Examples of technology for the excitation of a solid state lasing medium (thus placing this medium in a laser oscillating state) were disclosed in Japanese Patent Application, First Publication, Laid-Open No. 1-107588 (Solid State Laser Apparatus); and Japanese Patent Application, First Publication, Laid-Open No. 1-205484 (Laser Apparatus).

In the technology disclosed in Japanese Patent Application, First Publication, Laid-Open No. 1-107588, a plurality of excitation light sources comprising semiconductor lasers are disposed circumferentially around a lasing medium comprising a solid crystal, and energy conversion efficiency is increased by outputting excitation light into the radial center of the lasing medium; in the technology disclosed in Japanese Patent Application, First Publication, Laid-Open No. 1-205484, a plurality of gaps for the input of excitation light is formed in a portion of a reflecting surface surrounding the outer circumference of a solid crystal lasing medium, the excitation light is further confined by increasing the area of the reflecting surface, and the energy conversion efficiency is thereby increased.

However, in both of these technologies, excitation light sources are disposed around the cylindrical surface of a lasing medium, so that the total surface area of the reflective surface around the lasing medium is reduced by that area which is occupied by the excitation light sources themselves, and therefore the places at which the excitation light is inputted are incapable of performing reflection of the excitation light, so that there is a limit to the increase in energy conversion efficiency, and furthermore, there is a limit in obtaining a good distribution of the excitation of the lasing medium having high intensity at the central axis thereof.

SUMMARY OF THE INVENTION

It is accordingly an object of the present invention to provide a laser generating apparatus which produces:

(1) a high concentration of excitation light at the optical axial center of the lasing medium, thus increasing laser beam quality,
(2) increased laser output, and
(3) increased energy conversion efficiency.

In order to achieve the above-described object, the present invention provides a laser generating apparatus provided with:

a rod shaped laser medium for receiving excitation light and emitting laser light having a prespecified wavelength;

a reflecting tube having a central axis and possessing a surface of revolution and two end surfaces wherein an inner surface is made a reflecting surface, and said rod shaped laser medium is contained therewithin; and a virtual light source formation means for forming an excitation virtual light source, which is in effect a point light source or a line light source, in the vicinity of said central axis.

Hereinafter, what is meant by a "virtual light source" is excitation light introduced into the lasing medium with a cross-section; having a diameter which is less than the diameter of the rod shaped lasing medium which is used, or generally having lateral limits within the lateral limits of a coincident cross-section of the lasing medium; and furthermore, what is meant by a "virtual line light source" is a virtual light source of excitation light having a recurring cross-sectional diameter along the rod shaped laser medium which is less than the coincident cross sectional diameter of the rod shaped lasing medium which is used.

In this type of laser generating apparatus, the excitation light from the excitation light source is directed so as to enter into the reflecting tube, is reflected by the cylindrical reflecting surface of the reflecting tube, and thereby, the reflected light is concentrated at the optical axial center of the cylindrical lasing medium disposed at the optical axial center of the reflecting tube by means of a virtual light source forming apparatus, thereby producing a virtual point light source or a virtual line light source at the optical axial center of the lasing medium. In this way, improved excitation of the lasing medium is provided. Any excitation light which is not absorbed during one pass through the lasing medium is reflected by the cylindrical reflection surface, and the converging of the excitation light in the lasing medium is thereby repeated. For this reason, the excitation light from the light source is converged at the optical axis of the lasing medium, and a high concentration of excitation light, constituting a virtual light source, is produced at the optical axial center of the lasing medium so that high laser output from the lasing medium can be achieved.

In a preferred form of the present invention, the surface of revolution is a cylindrical surface, and this is the simplest form for the surface of revolution, the composition is simple, and the maintenance thereof is facilitated. Herein, the virtual light source formation apparatus comprises a light source disposed in the outer peripheral position with respect to the end surface of the reflecting tube, and apertures formed at at least one end surface of the reflecting tube which admits the light from the above-described excitation light source into the reflecting tube in a direction perpendicular to the above-described central axis.

In this construction of the present invention, laser light from the apertures is admitted into the interior of the reflecting tube at an appropriate angle with respect to the central axis, and in the interior of the reflecting tube which is sealed apart from the aperture or apertures, the reflection of the light at the cylindrical surface and the end surfaces is repeated. Seen from the central axial direction, the laser light is reflected at the cylindrical reflecting surface, the light is then collimated at the optical axial center of the laser medium, and by means of a repetition of these steps, a virtual light source is formed, the laser medium is excited in accordance with the degree of this repetition.

In this case, by selecting the angle of incidence in accordance with the relationship between the length and the diameter of the reflecting tube, the converging position in the central axial direction of the virtual light source can be appropriately selected, and this virtual light source can be made a point virtual light source which converges only at a specified point on the axis, a point series virtual light source which converges at a plurality of points, or a line virtual light source which is not divided into a plurality of points.

Herein, it is possible to make the light source a ring form light source which is disposed at an outer peripheral position with respect to the end surface of the reflecting tube. In this construction of the present invention, a ring shaped excitation light source is disposed in proximity to the outside of the end surface or side surface of the reflecting tube, the end surface of the reflecting tube serving as a reflection surface, and an aperture for allowing the excitation light to enter into the reflecting tube is formed in the central portion of the reflection surface at one end of the reflecting tube.

In this type of embodiment, the ring form excitation light from the excitation light source is converged when passing through the optical aperture at the central part of reflection surface at one end of the reflecting tube into the interior of the reflecting tube; this ring form excitation light is then reflected by the cylindrical reflection surface, and the converging thereof at the optical axial center of the lasing medium disposed at the optical axial center of the reflecting tube is repeated, and the lasing medium is excited in accordance with the degree of convergence.

Furthermore, in a separate preferred embodiment of the laser generating apparatus, a ring shaped excitation light source is disposed at a position in proximity to the end surface or side surface of the reflecting tube, an inner surface of the reflecting tube is a reflection surface, and instead of a simple aperture, a ring shaped opening for the input of excitation light is formed in the circumferential portion of the reflection surface of one end of the reflecting tube.

In this embodiment, the ring shaped excitation light from the ring shaped excitation light source passes through the ring shaped opening at one end of the reflecting tube to the interior of the reflecting tube, is converged at the optical axial center of the reflecting tube, and the reflection of the excitation light which is passed through the lasing medium by reflection at the cylindrical reflection surface and the convergence of the excitation light at the center of the reflecting tube at which the lasing medium is disposed are repeated, and the lasing medium is excited in proportion to the degree of convergence.

Furthermore, in another preferred embodiment, the reflecting tube is of a truncated conical shape, and in such a case, the light source for excitation is disposed at a position in proximity to the larger diameter opening of the conical reflecting tube.

In this embodiment, the excitation light from the excitation light source passes through the larger diameter opening of the truncated conical reflecting tube into the interior of the truncated conical reflecting tube, and each time this light is reflected from the reflection surface having a conical shape the displacement, in the axial direction, of the excitation light becomes smaller, and the excitation light concentration in the lasing medium is increased, thereby forming a virtual light source in the lasing medium. Furthermore, it is possible to provide a pair of conical reflecting tubes so that the larger diameter openings thereof face outward, and in such a case, light sources for excitation are disposed at positions in proximity with the larger diameter openings of the pair of conical reflecting tubes. In this case, excitation light is inputted from both directions along the optical axis, and the high concentration of excitation light in the lasing medium, producing a virtual light source, induces the lasing medium to enter into a lasing state.

Furthermore, in another preferred embodiment, the excitation light source for excitation has an arrangement that emits parallel beams, and in addition, a reflecting mirror for converging the parallel beams is disposed at the front end of the parallel beam emitting arrangement. In this case, the reflecting mirror should be a concave mirror or a truncated conical mirror, and the parallel beams which enter in a parallel state with respect to the optical axis are reflected by the concave mirror and converge on the optical axis, and thereby excitation light is concentrated in a virtual point light source form or a virtual line light source form. Based on the curvature of the concave mirror or the curvature of the truncated conical mirror and the angle of inclination, proper angles can be set with respect to the optical axial center of the lasing medium.

The parallel beams which are ring shaped, and which enter in a parallel state with respect to the optical axis, are reflected by the conical reflection surface or the concave mirror in the direction of the optical axial center of the reflecting tube, and excitation light as a virtual point light source or a virtual line light source is provided.

BRIEF DESCRIPTION OF THE DRAWINGS

FIG. 11(A) is a diagram showing the state of the beam for excitation in the cylindrical laser medium in the case one a particular convergence diameter a.

FIG. 11(B) is a diagram showing the state of the beam for excitation in the cylindrical laser medium in the case of a particular convergence diameter a.

FIG. 11(C) is a diagram showing the state of the beam for excitation in the cylindrical laser medium in the case of a particular convergence diameter a.

FIG. 11(D) is a diagram showing the state of the beam for excitation in the cylindrical laser medium in the case of a particular convergence diameter a.

FIG. 11(E) is a diagram showing the state of the light emanating from the collimator lens.

FIG. 12(A) is a diagram showing the result of the calculation of the energy distribution in the vicinity of the central axis of the excitation beam in the case of a particular convergence diameter a.

FIG. 12(B) is a diagram showing the result of the calculation of the energy distribution in the vicinity of the central axis of the excitation beam in the case of a particular convergence diameter a.

FIG. 12(C) is a diagram showing the result of the calculation of the energy distribution in the vicinity of the central axis of the excitation beam in the case of a particular convergence diameter a.

FIG. 13(A) is a diagram showing the results of the measurement of the energy distribution in the vicinity of the central axis of the excitation beam in the case of a particular convergence diameter a.

FIG. 13(B) is a diagram showing the results of the measurement of the energy distribution in the vicinity of the central axis of the excitation beam in the case of a particular convergence diameter a.

FIG. 14(A) is a diagram showing the results of the measurement of the energy distribution in the vicinity of the central axis of the laser beam generated from the laser medium in the case of a particular convergence diameter a.

FIG. 14(B) is a diagram showing the results of the measurement of the energy distribution in the vicinity of the central axis of the laser beam generated from the laser medium in the case of a particular convergence diameter a.

DETAILED DESCRIPTION OF THE PREFERRED EMBODIMENTS

Hereinbelow, preferred embodiments of a laser generating apparatus in accordance with the present invention will be explained with reference to FIGS. 1 to 9.

Figure 1:
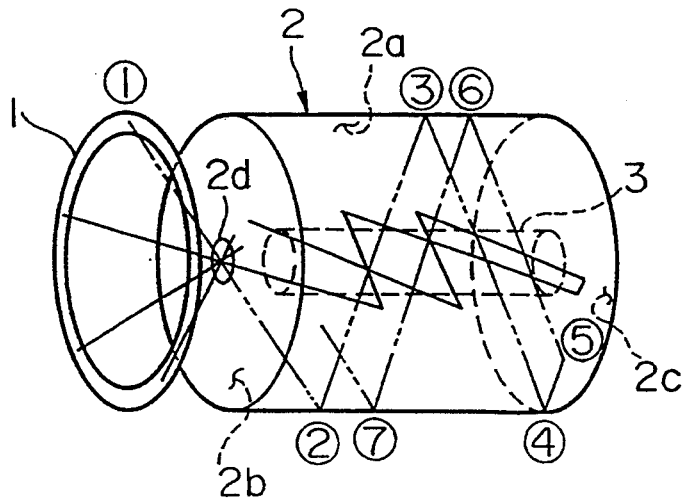
FIG. 1 is a perspective view showing a model of the main components in a first preferred embodiment of a laser generating apparatus in accordance with the present invention.
Figure 2:
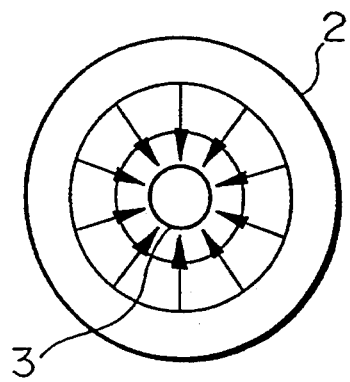
FIG. 2 is a side view showing a model of the main components of a first preferred embodiment of a laser generating apparatus in accordance with the present invention.

FIGS. 1 and 2 show conceptual explanatory diagrams of a first preferred embodiment of a laser generating apparatus in accordance with the present invention; reference numeral 1 indicates an excitation light source, reference numeral 2 indicates a reflecting tube, reference numeral 2a indicates a cylindrical reflection surface, reference numeral 2b indicates an end surface reflection mirror (reflection surface), reference numeral 2c indicates an end surface reflection mirror (reflection surface), reference numeral 2d indicates an optical aperture, and reference numeral 3 indicates a lasing medium (cylindrical lasing medium).

As excitation light source 1, a light source which groups a plurality of semiconductor lasers into a ring, or a light source which collects the outputs of such lasers into a ring form by means of an appropriate converging system or the like, may be used. By an arrangement passing the excitation light through optical aperture 2d into the interior of reflecting tube 2 and converging of the excitation light at the optical axial center of lasing medium 3, there results a virtual light source which can be deemed to be substantially a point light source. This excitation light source will be further described in the second embodiment and other embodiments below in detail.

In reflecting tube 2, a cylindrical reflection surface 2a is formed on the inner surface thereof, and a pair of end surface reflecting mirrors (reflecting surfaces) 2b, and 2c, which are perpendicular with respect to the optical axial direction, are formed at both ends. In a central part of one reflection surface 2b, an optical aperture 2d having the form of an aperture for the input of excitation light, in which the reflecting layer has been removed, is formed.

A cylindrical lasing medium comprising Nd·YAG or the like may be employed as the lasing medium (cylindrical lasing medium) 3; this lasing medium is disposed at the optical axial center line of the cylindrical reflection surface 2a.

In a laser generating apparatus such as that shown in FIGS. 1 and 2, comprising a combination of an excitation light source 1 producing excitation light which is converged at the optical aperture and a cylindrical reflection surface 2a, the excitation light propagates along the optical paths indicated by (1), (2), (3), (4), (5), (6), and (7). In the case in which a lasing medium is interposed therein, a virtual light source is produced in the lasing medium, and this lasing medium is excited and enters a laser oscillating state.

That is to say, in accordance with optical path (1) to (2) in FIG. 1, the excited light which is introduced into the interior of the reflecting tube 2 through optical aperture 2d converges at the optical axial center of the reflecting tube so as to form a virtual point light source, and by the excitation of lasing medium 3, energy absorption results. The excitation light which is not absorbed in one pass along the optical path from point (2) to point (3), is reflected at (3) on cylindrical reflection surface 2a and is reflected back toward the lasing medium 3. While being reflected at (4) on cylindrical reflection surface 2a, at (5) on end surface reflecting mirror 2c, and (6) on cylindrical reflecting surface 2a, the redirection of this excitation light into lasing medium 3 repeatedly occurs. Energy conversion efficiency is thereby increased. The absorption energy is concentrated in the central part of the lasing medium, and a concentration of excitation light is possible so that the absorbed energy is concentrated in the central portion of the cylindrical lasing medium.

In the case in which excitation light source 1 is a group of semiconductor lasers in a ring form, or the like, the excitation light converges at the center of the cylindrical lasing medium, thereby forming a virtual light source having a high energy concentration at the center thereof.

The individual beams for excitation which scatter from the convergence along the optical axial center of the cylindrical lasing medium scatter with a cylindrical wavefront from the optical axial center of the lasing medium.

The excitation light which is reflected by cylindrical reflection surface 2a propagates along optical paths which are identical, in the circular cross sectional surface (polar coordinate rθ surface) of cylindrical reflection surface 2a, to those of the scattered light. On the other hand, in a longitudinal cross sectional surface (rz surface) of cylindrical reflection surface 2a, the excitation light propagates so as to follow a zigzag optical path in the axial direction (z direction).

Accordingly, the excitation beams which are reflected by cylindrical reflection surface 2a are converged at the optical axis.

These beams are converged in cylindrical lasing medium 3 and the excitation of the lasing medium resulting in the generation of laser light occurs. The reflection of the excitation light passing through the lasing medium 3 via cylindrical reflection surface 2a and the convergence thereof in lasing medium 3, thereby forming a virtual light source are repeated a number of times. Convergence occurs at points having positions possessing different z coordinates along the optical axis.

The cylindrical reflection surface 2a and the lasing medium 3 which is disposed along the same axis absorb the energy of excitation beams between propagation processes in which the scattering and converging of excitation beams occur. In the process of light propagation, cylindrical symmetry is maintained so that the input into and output from cylindrical lasing medium 3 occur so that input is perpendicular to a surface having a nonuniform index of refraction, so that there is no refraction effect, and excellent convergence characteristics are thus maintained.

During light propagation having this type of cylindrical symmetry, the convergence of light is performed, and aberrations at the time of convergence can be ignored. Accordingly, the excitation beams which are not absorbed by lasing medium 3 and which pass therethrough are reflected by cylindrical reflection surface 2a and can be redirected to again attempt to excite lasing medium 3. Excitation resulting from a plurality of passes (optical paths) removes the limitations on the absorption coefficient of the excitation medium, so that it is possible to increase the convergence of excitation light concentrated at the center portion of the cylindrical lasing medium.

Furthermore, a more detailed explanation of the light propagation from convergence of the excitation light and the absorption process thereof is given by the formulas below.

$$(dI/dr) = -(\alpha + (1/r)) I \quad (1)$$

When $r = 0$, the light is convergent, and when $r = r_o$, the light is in a divergent state.

Here, I indicates the light intensity, r indicates the size of the r coordinate, $\alpha$ indicates the absorption coefficient, and $r_o$ is the radius of the cylindrical lasing medium. The first term on the right-hand side of the equation indicates the absorption process, while the second term expresses the influence of convergence and divergence.

This formula possesses a solution, and with respect to convergent light, becomes $$I = I_O (-r_O/r) \exp(-\alpha(r + r_O)) \quad (2)$$

Here, $I_O$ indicates the intensity of the inputted light.

From the above results, in the case in which the absorption coefficient is sufficiently large, the variation in the exponential function term is great and exceeds the variation in 1/r, so that this is equivalent to a one-dimensional absorption process, and as the inputted portion enters the interior, the light intensity decreases exponentially.

In the case in which the absorption coefficient is sufficiently small, the variation by means of 1/r dominates, so that a distribution results in which the light intensity increases in strength toward the center.

In the lasing medium, the proportion of the population distribution contributing to a population inversion is generally small, so that a phenomenon is observed in which the gain is saturated in the process of the laser oscillation.

Furthermore, there is an extremely large amount of the population distribution of the base state which relate to absorption, so that even if excitation is conducted with intense light, the absorption coefficient will not reach saturation. For this reason, in the absorption distribution, the optical intensity distribution is multiplied by the absorption coefficient.

Figure 3A:
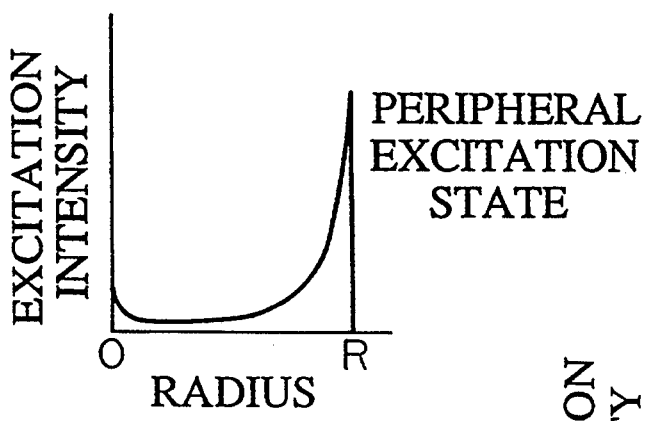
FIG. 3(A) is a graph of a theoretical absorption distribution using the product $\alpha r$ of the absorption coefficient $\alpha$ and the radius r, which shows a high absorption state (peripheral excitation).
Figure 3B:
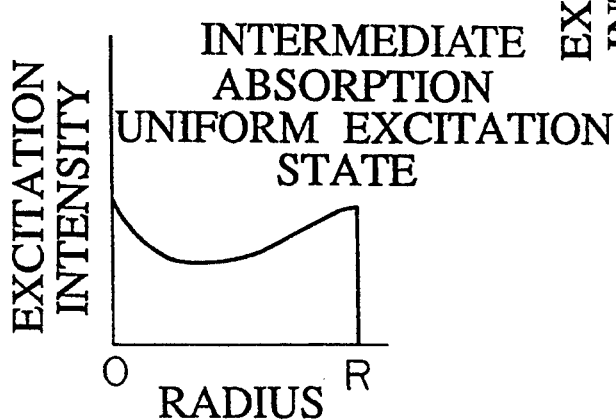
FIG. 3(B) is a graph of a theoretical absorption distribution using the product $\alpha r$ of the absorption coefficient $\alpha$ and the radius r, which shows a medium absorption state (uniform excitation).
Figure 3C:
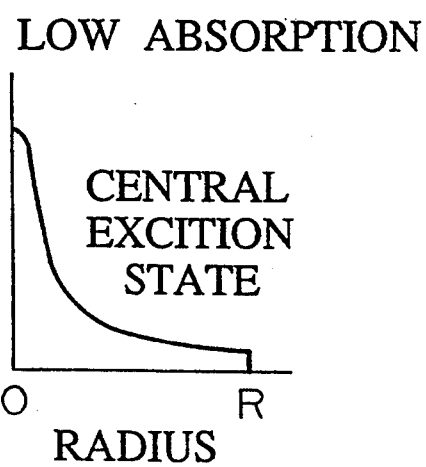
FIG. 3(C) is a graph of a theoretical absorption distribution using the product $\alpha r$ of the absorption coefficient $\alpha$ and the radius r, which shows a low absorption state (central excitation).

FIGS. 3(A), 3(B), and 3(C) show the theoretically obtained absorption distribution. Using the product $\alpha r$ of the absorption coefficient $\alpha$ and the radius r as a parameter, a high absorption state (peripheral excitation) is shown in FIG. 3(A), a medium absorption state (uniform excitation) is shown in FIG. 3(B), and a low absorption state (central excitation) is shown in FIG. 3(C).

If multiple pass excitation, in which excitation is repeated as many times as possible, is permitted, then all excitation power other than that lost by the reflecting mirrors will be absorbed by the lasing medium, even in the case of a lasing medium having low absorption, so that the energy conversion efficiency can be increased to an extreme degree.

Moreover, the excitation distribution makes use of the influence of the convergence of excited light, so that this light is caused to converge in a narrow area in the central part of the lasing medium, and it is possible to realize a high excitation light concentration with high efficiency. In order to conduct excitation, with high efficiency, within the mode volume of the optical resonator, it is preferable that the excitation distribution concentrated in the center conduct high output oscillation in the TEM00 basic horizontal mode.

That is to say, this works as an active horizontal mode control space filter controlling gain distribution. The effects of this type of gain control space filter have already been demonstrated in end surface excitation YVO4.

In the examples of the present application, a virtual light source was formed from excitation light source 1; for this reason, there is in principle no restriction on light source intensity.

If the composition employs a virtual light source, then the excitation power and the size of the light source and the intensity per surface unit area are not restricted.

Furthermore, side surface excitation is employed which uses cylindrical reflection surface 2a, so that the excitation power input surface is extremely large.

In the case of end surface excitation, it is necessary to conform the input cross section of the excitation beam to a region which is equal to or narrower than the mode waist of the optical resonator; however, in the case of side surface excitation, the input cross section of the excited light is the entirety of the side surface.

It could be said that the multiple pass excitation described above is realized because the excitation light is readily converged at the center of the lasing medium, forming a virtual light source.

In the technology disclosed in Japanese Patent Application, First Publication No. 1-107588 and Japanese Patent Application, First Publication No. 1-205484, the light passing through the lasing medium interfered with the light sources disposed at the sides of the lasing medium and hindered further optical propagation, so that a point light source could not be formed in the medium, and light propagation in which reflection and excitation were repeated multiple times was extremely restricted; however, in the technology of the embodiments depicted in FIGS. 1 and 2, .the convergence of the excitation light at the optical axial center of the cylindrical lasing body allows scattering and reconvergence when the excitation light moves through the optical axial center of the cylindrical lasing medium, so that no restrictions are placed on reflection and excitation, and it is a simple matter to increase excitation strength and laser output.

Figure 4:
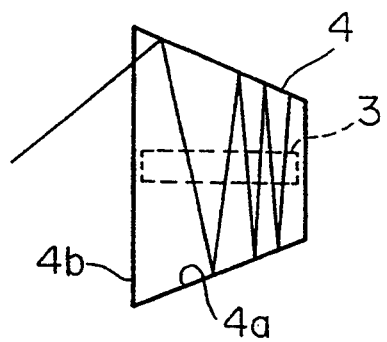
FIG. 4 is a schematic diagram of the main components of a second preferred embodiment of a laser generating apparatus in accordance with the present invention.

FIG. 4 shows a second preferred embodiment of a laser generating apparatus in accordance with the present invention; in reflecting tube 2, in place of the cylindrical reflection surface 2a depicted in FIG. 1, a conical reflecting tube 4 possessing a reflection surface having a conical shape (conical reflection surface) 4a is employed.

Excitation light sources 1 are disposed at positions outside the large diameter opening 4b which is the larger diameter opening in conical or truncated conical reflecting tube 4, and the excitation light from excitation light sources 1 passes through the large diameter opening 4b of conical reflecting tube 4, is inputted at an angle with respect to the plane passing through the rim of the larger diameter opening of conical reflecting tube 4 to the interior conical reflection surface 4a, and this excitation light is converged, is scattered after exciting lasing medium 3, and reflection and converging of the excitation light by conical reflection surface 4a is repeated; the amount of displacement of the excitation light in the optical axial direction decreases with each reflection, so that the excitation light concentration in lasing medium 3 steadily increases.

Figure 5:
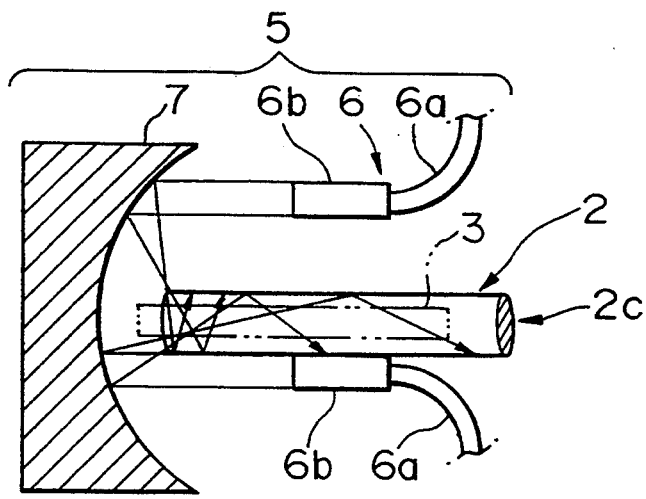
FIG. 5 is a front cross sectional view showing a third preferred embodiment of a laser generating apparatus in accordance with the present invention.
Figure 6:
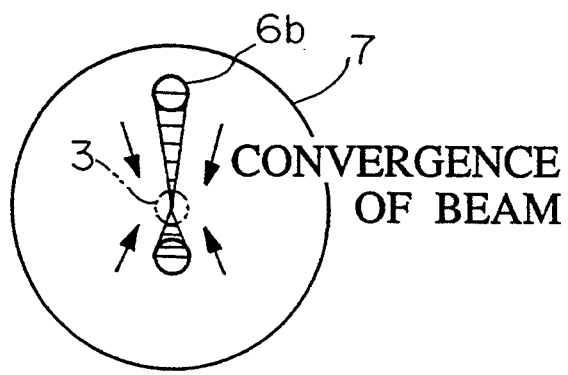
FIG. 6 is a cross sectional view showing a model of a third preferred embodiment of a laser generating apparatus in accordance with the present invention.

FIGS. 5 and 6 depict a third preferred embodiment of a laser generating apparatus in accordance with the present invention; in place of the excitation light source 1 of the example shown in FIG. 1, excitation light source 5 is provided with parallel beam emitting mechanism 6, and a concave mirror 7 is disposed at a front end of parallel beam emitting mechanism 6 and converges the parallel beams.

Parallel beam emitting mechanism 6 comprises optical fibers 6a which conduct laser beams from an external laser beam generating apparatus and cell Foch lenses (or lenses for collimators) 6b, and furthermore, concave mirror 7 comprises, for example, a concave mirror having a shape which is generally a portion of a sphere.

A plurality of parallel beams conveyed in a parallel state with respect to the optical axis by parallel beam emitting mechanism 6 is irradiated onto concave mirror 7 and reflected, and is then converged along the optical axis; in the case of a concave mirror which is a portion of a sphere, as the focal position is displaced by a small amount at a time in the optical direction, excitation light is converged along the axis, providing a virtual light source.

In the case of the third preferred embodiment, based on the curvature of concave mirror 7, the angle of input of the excitation light can be set with respect to the optical axis.

Figure 7:
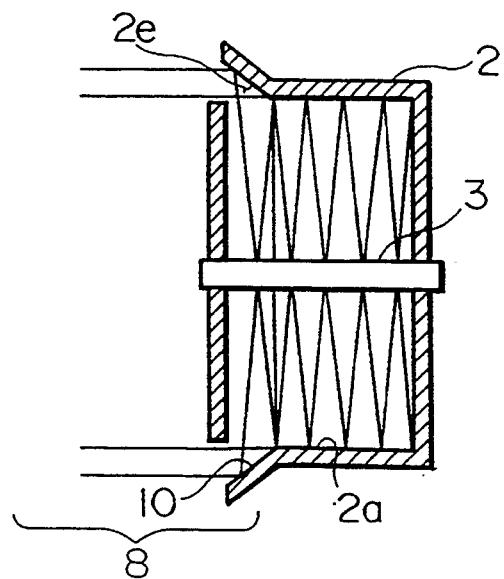
FIG. 7 is a front cross sectional view showing a fourth preferred embodiment of a laser generating apparatus in accordance with the present invention.
Figure 8:
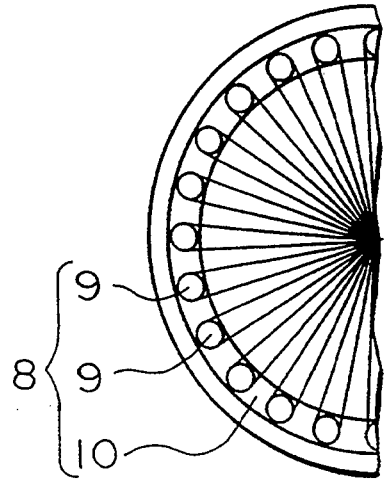
FIG. 8 is a partial simplified side view showing a fourth preferred embodiment of a laser generating apparatus in accordance with the present invention.

FIGS. 7 and 8 show a fourth preferred embodiment of a laser generating apparatus in accordance with the present invention; excitation light source 8 is provided with parallel beam emitting mechanisms 9 which are disposed in a ring shape, and a ring form conical reflection surface 10 is disposed in a state of mutual opposition with respect to the front end of the parallel beam emitting mechanisms 9 and inputs the parallel beams in the direction of the optical axial center of the interior of reflecting tube 2.

Parallel beam emitting mechanisms 9 have a composition in accordance with the third preferred embodiment, and conical reflection surface 10 is formed with a tapered shape which opens outward from the opening of cylindrical reflection surface 2a.

Ring shaped parallel beams are conveyed in a parallel state with respect to the optical axis, pass through ring shaped opening 2a, and are reflected by conical reflection surface 10, and by means of the inputting of these beams in the direction of the optical axial center of reflecting tube 2, excitation light is converged.

Figure 9:
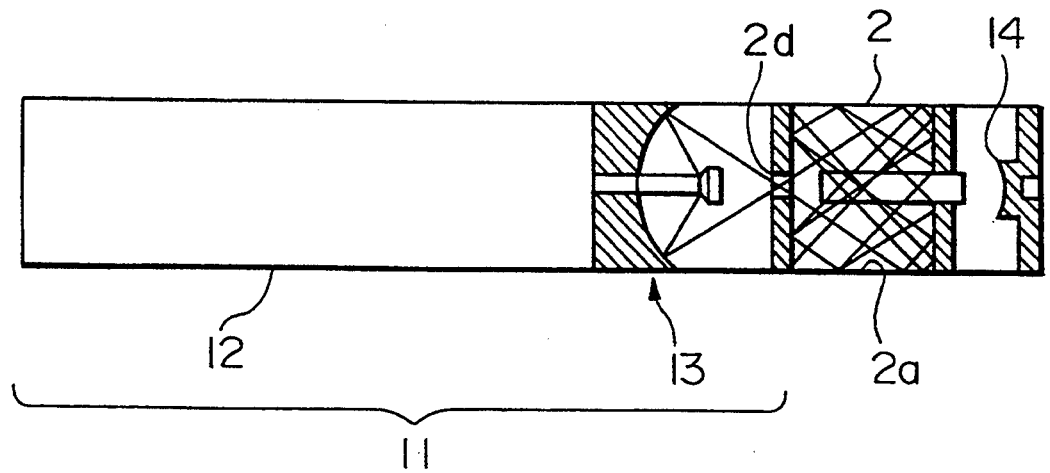
FIG. 9 is a front cross sectional view showing a fifth preferred embodiment of a laser generating apparatus in accordance with the present invention.

FIG. 9 shows a fifth preferred embodiment of a laser generating apparatus in accordance with the present invention; excitation light source 11 has a structure in which a high output argon laser emitting mechanism 12 and a Cassegrain antenna optical telescope 13 are combined, so that, for example, excitation light (an excitation laser beam) emitted by the laser emitting apparatus 12, such as a high output argon laser or the like, is expanded and converged by the Cassegrain antenna optical telescope 13, and the point of convergence is formed at the optical aperture 2d in the optical axial center of cylindrical reflection surface 2a, and a virtual light source is formed.

In this case, using an argon excitation colored laser or a titanium sapphire laser, it is possible to conduct high quality laser generation.

In FIG. 9, reference numeral 14 indicates a coupling mirror.

Other Embodiments

In a laser generating apparatus in accordance with the present invention, in each of the preferred embodiments described above, it is possible to adopt the following technology.

a) A laser generating system in which conical reflecting tubes 4 of the example shown in FIG. 4 are disposed along the optical axis so as to face in opposing directions, wherein a pair of excitation light sources disposed outside large diameter openings 4b input excitation light through both large diameter openings 4b.

b) In order to increase the amount of excitation light, mirrors are generally portions of spheres, or conical or truncated conical reflection mirrors are disposed at both ends.

c) A plurality of parallel beams are disposed on concentric circles having the optical axial center as the center thereof.

Experimental Example

Figure 10:
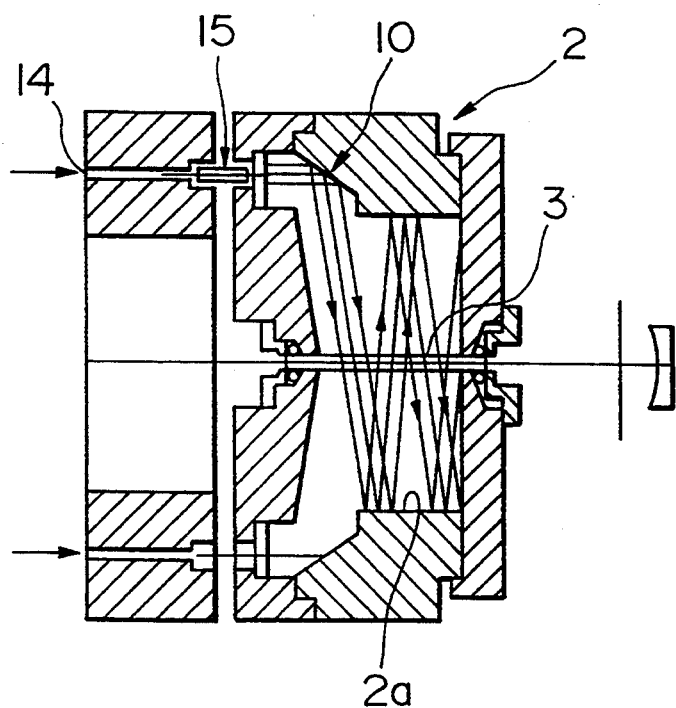
FIG. 10 is a cross sectional view showing the example of FIG. 7 in a more detailed and concrete manner.

FIG. 10 shows the example of FIG. 7 more concretely and in greater detail, and identical parts thereof are numbered similarly; the angle of inclination of the truncated conical reflection surface 10 is 40° with respect to a line parallel to the central axis in the cross section of the diagram. An optical fiber which is connected to a light generating semiconductor element is connected to light input aperture 14, a plurality of collimator lenses 15 for rendering inputted light parallel is disposed corresponding to positions of connected optical fibers, between light input aperture 14 and truncated conical reflection surface 10.

The light which is inputted from the optical fibers is ideally rendered parallel by means of collimator lenses 15, is collimated on the central axis as shown in FIG. 11(A), and in this case, the collimating diameter a=0. However, it is difficult to render the light perfectly parallel in actuality, so that the diameter a of the converged light is made definite. Here, when a is larger than the diameter D of the laser medium, as shown in FIG. 11(B), the virtual light source cannot be termed a "point light source", and this is a case of conventional side-surface excitation as in the conventional technology. However, if a can be made smaller than D, as shown in FIGS. 11(C) and 11(D), then the virtual point light source of the present invention results, and it is further possible to make this a line light source by means of the reflection of cylindrical surface 2a. The light distribution in the vicinity of the central axis was calculated in the cases of FIGS. 11(B), 11(C), and 11(D), and the results are shown in FIGS. 12(A), 12(B), and 12(C).

The size of this type of collimating diameter a is determined by the degree of parallelism of the light beams with which the truncated cone reflection surface 10 is irradiated, and this degree of parallelism can be varied by varying the focal length of collimator lenses 15. The experimental results obtained by the use of the apparatus of FIG. 10 are given below.

| Collimator Lens | Scattering Angle (Parallelism Degree) | Collimating Diameter a (with respect to a rod having a diameter of 2 mm) |
| --- | --- | --- |
| Case 1 f = 5.4 mm | 1.92° | 2.1 mm |
| Case 2 f = 25 mm | 0.32° | 1.0 mm |
| Case 3 f = 50 mm | 0.04° | 0.5 mm |

In the experimental results, when the scattering degree of the parallel beams exceeded a certain angle (1.92° or more), collimation was impossible with respect to the rod, so that a virtual point light source could not be formed.

Figure 15:
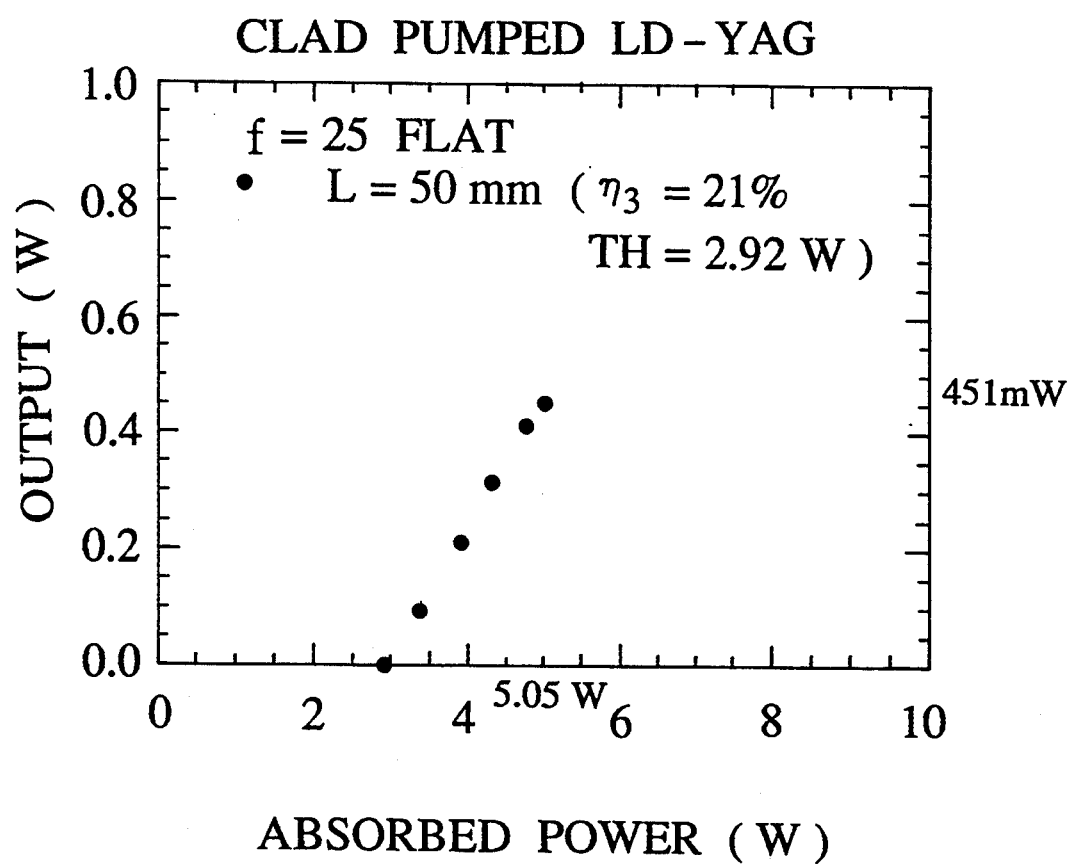
FIG. 15 is a graph showing the relationship between the input power and the output power in the virtual light source creation technique of the present invention.

Herein, the scattering angle $\delta$ was the angle at which the light exiting the lens formed in the axis of the lens. The light distribution in Cases 1 and 2 is shown in FIGS. 13(A) and 13(B). Furthermore, the mode of the lasers generated from laser medium 3 which was excited in these cases is shown in FIGS. 14(A) and 14(B). In the conventional side surface excitation method corresponding to Case 1, the distribution is split, whereas in the case of Case 2, the distribution is concentrated in the center, and a high-quality laser beam was formed. FIG. 15 is a graph showing the relationship between the input power and output power in the virtual light source method of the present invention.

What is claimed is:

1. A laser generating apparatus comprising:
a rod shaped laser medium for receiving excitation light and emitting laser light having a wavelength;
a reflecting tube having a central axis and inwardly conforming to a surface of revolution at which it is reflective and having at least one end surface, said rod shaped laser medium being contained at said central axis therewithin; and
means for generating laser excitation light from outside said reflective tube and for converging the excitation light on an optical axis of said rod shaped laser medium to form a first laser excitation light region within said rod shaped laser medium, wherein the excitation light diverges from said first laser excitation light region toward a portion of the reflecting surface of said reflecting tube and is reflected convergently back from said portion of the reflective surface to form a second laser excitation light region displaced from said first laser excitation light region along said optical axis and within said rod shaped laser medium, the diverging and the reflecting convergently continuing and providing a plurality of said second laser excitation light regions along said optical axis and all within said rod shaped laser medium, thereby defining a plurality of excitation virtual light sources along said optical axis of said rod shaped laser medium to yield output generated laser light.

2. A laser generating apparatus in accordance with claim 1, wherein said surface of revolution is a cylindrical surface.

3. A laser generating apparatus in accordance with claim 2, wherein said generating means introduces the excitation light at a position peripheral to said at least one end surface of said reflecting tube, which has an aperture in said at least one end surface admitting said excitation light into said reflecting tube in a direction intersecting said central axis.

4. A laser generating apparatus in accordance with claim 1, wherein said surface of revolution is a truncated conical surface.

5. A laser generating apparatus in accordance with claim 4, wherein said generating means introduces the excitation light at a position peripheral to said at least one end surface, which is an end surface of a large diameter side of said reflecting tube, which has an aperture in said at least one end surface admitting said excitation light into said reflecting tube.

6. A laser generating apparatus in accordance with one of claim 3 and 5, wherein said light source is a ring-form light source disposed in a plane perpendicular to said central axis.

7. A laser generating apparatus in accordance with one of claims 1 to 4, wherein said generating means is provided with a parallel beam generating means, and a reflecting mirror for collimating parallel beams, disposed at a position facing said parallel beam generating means.

8. A laser generating apparatus in accordance with claim 7, wherein said reflecting mirror is a concave mirror.

9. A laser generating apparatus in accordance with claim 7, wherein said reflecting mirror is a truncated conical mirror.

10. A laser generating apparatus in accordance with claim 7, wherein said reflecting mirror is formed at the outer periphery of said end surface.

11. A laser generating apparatus comprising:
a laser medium for receiving excitation light and emitting laser light;

a reflecting structure having a central region and a reflective inner surface at least partly surrounding said central region, said laser medium being contained at said central region; and means for introducing laser light as the excitation light from outside said reflecting structure and for converging the excitation light into a first cross-section of said laser medium of first lateral dimensions in said laser medium, said excitation light having a second cross section coincident with said first cross section and of second lateral dimensions respectively smaller than said first lateral dimensions, said laser medium having a third cross section displaced from said first cross section, and said reflecting structure being shaped to provide a fourth cross section of nonabsorbed excitation light within the limits of said third cross section.

12. A laser generating apparatus in accordance with claim 11, wherein said laser medium has a resonation axis, said reflecting structure having a central axis through said laser medium, and said introducing means introduces the excitation light at a position peripheral to a portion of the reflective inner surface of said reflecting structure nearest to an extremity of the laser medium on the resonation axis, said portion of said reflective surface having an aperture admitting said excitation light into said reflecting structure in a direction intersecting said central axis.

13. A laser generating apparatus in accordance with claim 11, wherein said introducing means includes a parallel beam generating means having collimating means for generating parallel beams and a reflecting mirror for focusing parallel beams at a position facing said parallel beam generating means.

* * * * *